United States Patent [19]

Dagan et al.

[11] Patent Number: 4,523,061

[45] Date of Patent: Jun. 11, 1985

[54] SWITCHING ASSEMBLY FOR TELEPHONE CABLES

[75] Inventors: Gideon B. Dagan, Santa Monica; Charles W. Waas, Huntington Beach, both of Calif.

[73] Assignee: Communications Technology Corporation, Los Angeles, Calif.

[21] Appl. No.: 550,311

[22] Filed: Nov. 10, 1983

[51] Int. Cl.³ .............................................. H01H 3/00
[52] U.S. Cl. ..................................... 200/17 R; 200/18
[58] Field of Search ............ 200/1 R, 5 R, 5 A, 16 R, 200/17 R, 18; 361/350-352

[56] References Cited

U.S. PATENT DOCUMENTS

| | | | |
|---|---|---|---|
| 3,196,223 | 7/1965 | Hartsock | 200/18 X |
| 3,784,765 | 1/1974 | Daly | 200/18 X |
| 4,115,670 | 9/1978 | Chandler | 200/18 X |
| 4,195,207 | 3/1980 | Summansson | 200/17 R X |
| 4,358,646 | 11/1982 | Martinez | 200/18 X |

Primary Examiner—J. R. Scott
Attorney, Agent, or Firm—Harris, Kern, Wallen & Tinsley

[57] ABSTRACT

A switching assembly for selectively connecting telephone cable to a test set or the like. A mounting panel provides connectors for receiving two twenty-five pair telephone cables, and a third connector for receiving another twenty-five pair cable. A set of switches provides for connecting the third connector to either the first or second connector. The switches are mounted in a row on a printed circuit board and are driven by a sliding actuator plate carried between the switches and the mounting panel, with a rotating knob driving the actuator plate to control the switches, and indicating which of the first and second connectors is being connected.

5 Claims, 5 Drawing Figures

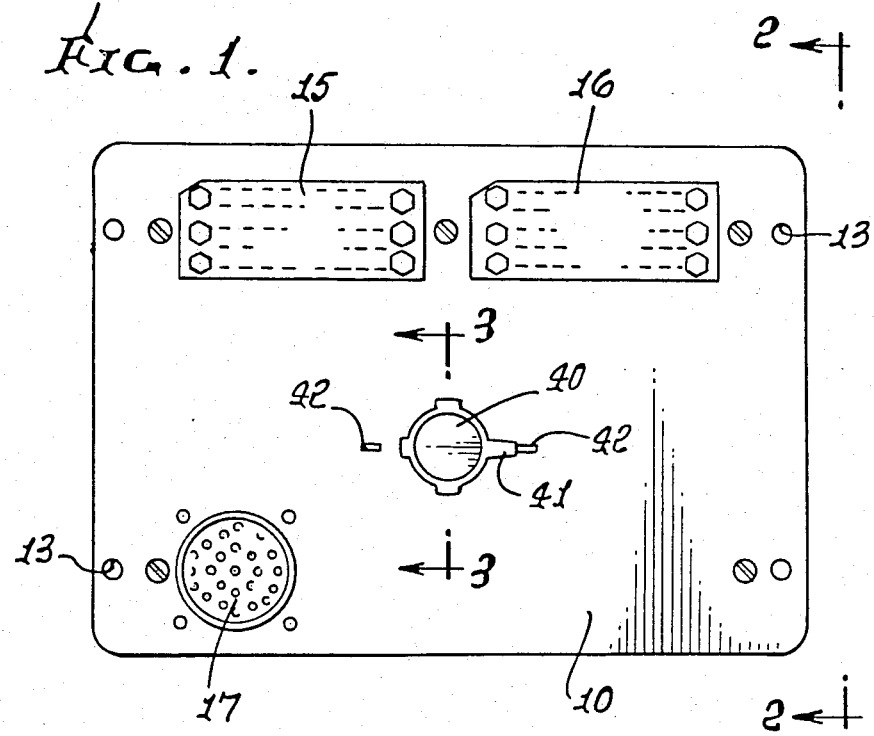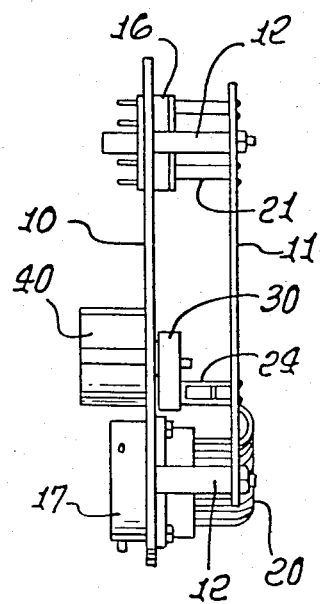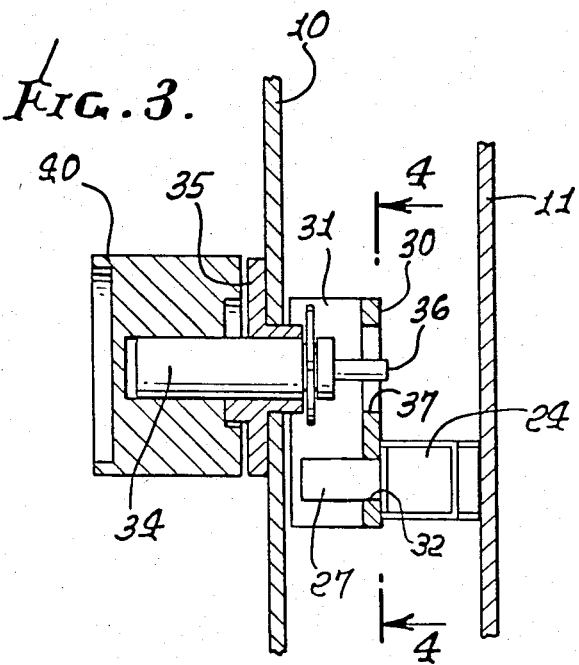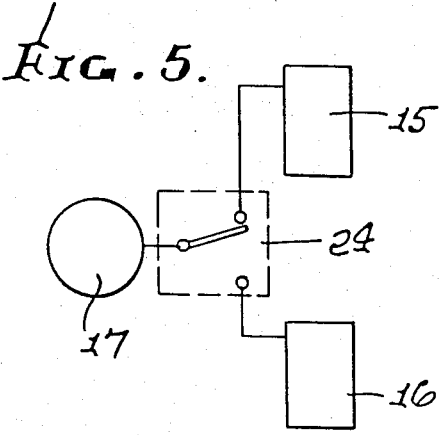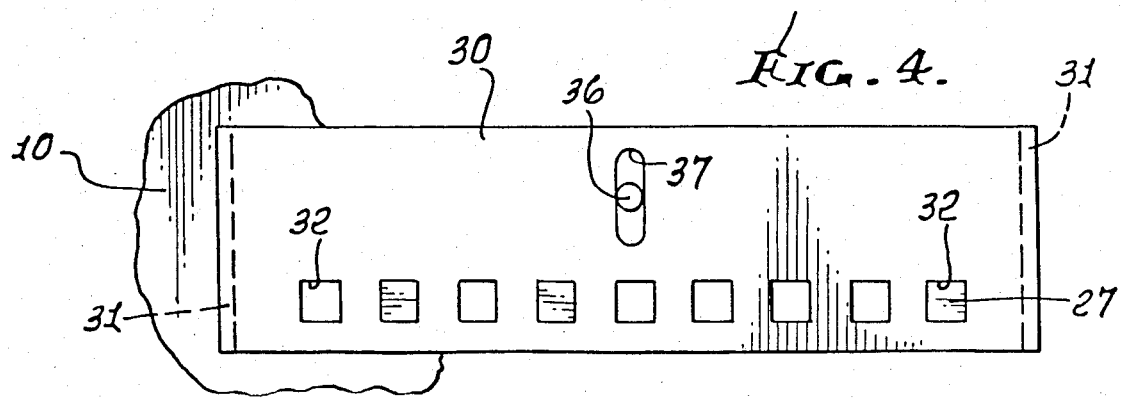

SWITCHING ASSEMBLY FOR TELEPHONE CABLES

BACKGROUND OF THE INVENTION

This invention relates to the testing of telephone equipment and in particular, to a new and improved switching assembly for connecting test equipment to selected telephone cables. Telephone cables typically are terminated in cable connectors, and one standard configuration is a fifty conductor connector providing for handling twenty-five line pairs. Various types of equipment are utilized in testing and analyzing telephone equipment and in some situations, it is desirable to be able to selectively connect the test equipment to more than one telephone cable. In the normal situation, this calls for the test person to physically plug the cable connector into the test equipment either directly or by means of an adaptor cable. Then when it is desired to connect the test equipment to another telephone cable, the first connection is physically taken apart and the second connection is physically made. This procedure may be repeated several times during a testing sequence.

Considerable time and effort are wasted in making the connections and changing the connections, and with every connection or disconnection there is the likelihood of damage to the connector components.

Accordingly, it is an object of the present invention to provide a new and improved switching assembly which permits a test person to selectively connect a piece of test equipment to either of two telephone cables and to change the connection as often as desired without requiring any physical moving of connectors.

It is another object of the invention to provide such a switching assembly which is easily packaged in a small container, which is manipulated by a single motion, typically a knob rotation, and which clearly indicates the cable to which the test equipment is connected.

These and other objects, advantages, features and results will more fully appear in the course of the following description.

SUMMARY OF THE INVENTION

A switching assembly for selectively connecting telephone cables to a test set or the like, including mounting panel means having a circuit board, first, second and third cable connectors carried on the panel means, along with a plurality of switches on the circuit board, with each switch having an actuator for actuating the switch between first and second positions. The circuit board, preferably a printed circuit board with the switches and first and second cable connectors directly mounted thereon, provides electrical connections between the third cable connector, the switched and the first and second cable connectors.

In the preferred embodiment, each connector has a capacity of fifty conductors thereby handling twenty-five line pairs, and the plurality of switches is required in order to handle this many conductors. The switches are controlled as a group by means of an actuator plate slidingly carried at the mounting panel and having means for engaging the switch actuators. This preferably comprises a plate with a plurality of spaced openings for receiving the actuators of the individual switches, and an eccentric shaft configuration for converting rotary shaft motion to translating actuating plate motion in the switches.

BRIEF DESCRIPTION OF THE DRAWING

FIG. 1 is a top view of a switching assembly incorporating the presently preferred embodiment of the invention;

FIG. 2 is a side view taken along the line 2—2 of FIG. 1;

FIG. 3 is an enlarged partial sectional view of a portion of FIG. 2;

FIG. 4 is a sectional view taken along the line 4—4 of FIG. 3; and

FIG. 5 is an electrical schematic illustrating the operation of the switching assembly.

DESCRIPTION OF THE PREFERRED EMBODIMENT

The switching assembly is carried on a mounting panel 10 and includes a circuit board 11 supported on the mounting panel by stand-offs 12. The switching assembly may be placed in a carrying case or mounted on a rack or otherwise as desired, by means of screws through openings 13 at the edges of the panel.

Cable connectors 15, 16 and 17 are attached to the mounting panel 10. In the embodiment illustrated, the cable connectors 15 and 16 are identical and are standard connectors which will handle twenty-five telephone line pairs. The connector 17 may also be a conventional connector with fifty conductors, and in the embodiment illustrated, is mounted on the panel 10. A plurality of conductors 20 run from the backside of the connector 17 to appropriate locations on the circuit board 11. The circuit board preferably is a printed circuit board, with the backsides of the conductors 21 of the connectors 15, 16 directly connected to the board 11 by soldering.

A plurality of switches 24 is also mounted on the circuit baord 11, preferably directly mounted by having the conductors of the switches inserted in holes of the circuit board and soldered in place. The cable connectors 15, 16 project through openings in the panel 10.

The switches 24 provide a plurality of sets of single pole double-throw contacts, one being shown in FIG. 5, and in the embodiment illustrated, each switch has six such sets. In order to handle twenty-five telephone line pairs, nine switches are required. Each switch has a switch actuator 27 which when manipulated controls all nine sets of contacts of the switch. In the embodiment illustrated, the actuator 27 is a slide-type actuator, but other types of actuators could be used such as a push-type actuator.

The switches 24 are mounted in a line along an axis parallel to the slide axis of the switch actuators 27. An actuator plate 30 is positioned between the mounting panel 10 and the switches 24. This plate 30 preferably is a metal strip with downturned ends 31 which serve to maintain the actuator plate 30 in position between the mounting panel 10 and switches 24. Openings 32 as illustrated in FIG. 4 are provided in the actuator plate 30 for receiving the actuators 27 of the switches. The actuator plate 30 is caused to slide or translate by means of a shaft 34 mounted in a bushing 35 in the panel 10. A pin 36 is eccentrically mounted on the shaft 34 and rides in a slot 37 in the actuator plate 30 so that rotational motion of the shaft 34 is converted to translational motion of the actuator plate 30 by the eccentric pin 36 and slot 37.

A knob 40 may be mounted on the shaft 34 for ease of actuation. Preferably the knob 40 has a pointer 41 which is aligned with indicia 42 at the two extremes of rotation permitted by the mechanism. Hence the position of the pointer 41 indicates to the telephone service person which of the cable connectors 15, 16 is connected to connector 17. In the embodiment illustrated, the shaft 34 rotates 180° during a switching operation and the acutator plate 30 operates nine switches at the same time, thereby operating all fifty-six sets of contacts. Of course only fifty of the contact sets will be utilized for twenty-five line pairs.

In use, a test set or other piece of equipment is provided with a cable and connector mating with the connector 17. This permits the test set to be plugged into the switching apparatus. The connectors 15, 16 are selected to mate with connectors in the equipment to be tested. When testing is to be performed, the test person will plug the test set onto connector 17. Then he will disconnect the appropriate cables in the telephone equipment and plug one of them onto the connector 15 and the other onto the connector 16. Then the testing will proceed in the usual manner, with the operator selecting one of the telephone cables by approriately rotating the knob 40.

We claim:

1. In a switching assembly for selectively connecting telephone cables to a test set or the like, the combination of:

mounting panel means including a circuit board;

first and second cable connectors carried on said panel means;

a third cable connector carried on said panel means;

a plurality of switches carried on said circuit board, each of said switches having an actuator for actuating each of said switches between first and second positions;

said circuit board providing electrical connections between said third cable connector, said switches, and said first and second cable connectors;

an actuator plate slidingly positioned between said panel means and said switches, said plate having means for engaging said switch actuators; and means for sliding said actuator plate to actuate said switches between said first and second positions and selectively connect said third cable connector to one of said first and second cable connectors.

2. A switching assembly as defined in claim 1 wherein said circuit board is a printed circuit board with said switches and first and second cable connectors soldered directly thereto.

3. A switching assembly as defined in claim 2 wherein said switch actuators project outward from the respective switches, and said actuator plate includes a plurality of spaced openings for receiving said switch actuators so that translation of said actuator plate translates said switch actuators.

4. A switching assembly as defined in claim 3 wherein said means for sliding includes a rotating shaft mounted in said panel means and having an eccentric pin engaging a slot in said actuator plate.

5. A switching assembly as defined in claim 4 including a knob mounted on said rotating shaft on the external side of said panel means, and having pointer means indicating the one of said first and second connectors that is connected to said third connector by said switches.

* * * * *